(12) United States Patent
Farrag

(10) Patent No.: US 6,223,541 B1
(45) Date of Patent: May 1, 2001

(54) METHOD AND DEVICE FOR THE AFTER-COOLING OF A PREFORM IN THE INJECTION MOLDING PROCESS

(75) Inventor: Rainer Farrag, South elgin, IL (US)

(73) Assignee: Fasti, Farrag & Stipsits GesmbH, Hopfgarten I. Br. (AT)

( * ) Notice: Subject to any disclaimer, the term of this patent is extended or adjusted under 35 U.S.C. 154(b) by 0 days.

(21) Appl. No.: 09/394,456

(22) Filed: Aug. 17, 1999

(51) Int. Cl.⁷ .................................................... F25D 25/00
(52) U.S. Cl. ................. 62/62; 425/526; 425/548
(58) Field of Search .................. 62/62; 425/526, 425/548; 264/237

(56) References Cited

U.S. PATENT DOCUMENTS

| | | | |
|---|---|---|---|
| 4,389,366 | * 6/1983 | Hoesslin et al. | 264/558 |
| 5,513,445 | 5/1996 | Farrag | 34/362 |
| 5,837,299 | * 11/1998 | Bright et al. | 425/526 |

* cited by examiner

Primary Examiner—Corrine McDermott
Assistant Examiner—Malik N. Drake
(74) Attorney, Agent, or Firm—Baker & Daniels

(57) ABSTRACT

The present invention relates to improving the after-cooling process of preforms from the injection molding process in respect to its efficiency and its economy.

46 Claims, 11 Drawing Sheets

METHOD AND DEVICE FOR THE AFTER-COOLING OF A PREFORM IN THE INJECTION MOLDING PROCESS

The object of the present invention is a method and a device for the after-cooling of a preform which was produced in the injection molding process

BACKGROUND OF THE INVENTION

Such preforms are produced in the injection molding process with the aim of blowing from them—in a later process step of a subsequent hollow blast process—hollow body such as, for example, a plastic bottle, a plastic container or the like. In order, therefore, to produce such a preform in the injection molding process there is required in a manner known per se an injection molding machine which essentially consists of two mold halves movable with respect to one another, in which the one mold half which is connected to an extruder injects corresponding hot-fluid plastic material into the mold half, after which then the mold half is cooled and the preform is now present in the injection molding machine in the allocated mold core.

In order properly to cool such a still very hot preform, it is a known practice to remove the preform from the injection molding machine and to bring it into a so-called after-cooling plate. In the after-cooling in the after-cooling plate, it is a known practice to receive the preform in corresponding cooled cavities of the after-cooling plate and to cool this preform at least on its outer circumference. As cooling agent there is used here in particular a liquid cooling medium such as, for example, water, oil or the like. It is also possible, however to use cooled air.

With this after-cooling of the preform in the after-cooling plate there is present, however, the disadvantage that the preform is only insufficiently cooled, because precisely the cooling performance in this after-cooling process is limited. As stated, the cooling occurs only on the outer circumference of the preform, which leads to the result that a temperature gradient arises in the direction of the interior space of the preform, which leads to a deterioration of the plastic material. Namely, in such an after-cooling, the plastic material tends toward a transformation of the crystal structure into the crystalline structure form, which severely impairs the quality of the preform. In the subsequent hollow blast process the preform, therefore can be further processed only with difficulty and with losses of quality.

OBJECTS AND SUMMARY OF THE INVENTION

Underlying the invention is the problem of further developing a process and apparatus for improving the cooling performance in an after-cooling plate so that there is achieved a substantially better quality of the preform material, with better cooling performance, and so that the cooling agent is recovered.

For the solution of the problem posed the process/method is characterized in that during the after-cooling also the interior space of the preform is cooled by means of a cooling medium.

With this essential process step there is present the advantage that now the cooling of the preform no longer occurs solely from its outer circumference inward, but that the preform is now also cooled in its interior. The precondition here is that the preform is open at least on one side and is accessible from outside from the after-cooling plate, so that from this opening the cooling medium can be introduced into the interior space of the preform.

Here there are claimed by the invention all known types of cooling medium. In a preferred form of execution the process is executed by the means that as cooling medium cooled, dried air is injected.

As temperature for this cooling air there can be used here room temperature or a cooling temperature going as low as $-35°$ C., at which moisture contents ranging from 0% relative humidity to maximally 98% relative humidity can be used.

If in particular cooled, dried pressing air is used, then temperatures in the range from $+5°$ C. to maximally (sic) $-35°$ C. are preferred, there being used with these air temperatures an air near the dew point, just short of the dew point.

Obviously the use of air as a cooling medium is not is not to be understood as restrictive for the present invention. There can also be used other cooling media, such as, for example, an air that is enriched with water in spray form, or only a liquid cooling medium such as, for example, cooled water at room temperature, or other liquid cooling media, such as, for example, alcohol or alcoholic solutions.

The process relates generally to the feature that the interior space of the preform is cooled with the preferably gaseous medium cooling medium. For this it is required that the cooling medium be blown or injected into the interior space of the premold. For this form of execution there are a number of different possibilities which are all claimed as essential to the invention.

In a first form of execution of the present invention it is provided that the preferably gaseous cooling medium is brought in through a feed element in the form of a mouthpiece onto the preform and the gaseous cooling medium is pressed into the preform under excess pressure.

In the interest of simplicity in the following description of the invention there is taken as starting point a gaseous cooling medium, although the present invention also lays claim to all other types of cooling media.

When, therefore, such a gaseous cooling medium is injected into the preform, then in a first form of execution it is provided accordingly that a corresponding blast mouthpiece is placed on the opening of the preform and the preform is blown out with this cooling medium.

In a second form of execution of a corresponding device it is preferred if the blast mouth piece extends not only to the opening of the premold, but if the blast mouthpiece plunges into the premold, so that this blast mouthpiece is constructed as a plunger tube which plunges as deeply as possible into the preform and provides this with cooling air on its inside from its base surface, which cooling air flows along the inner surface of the preform in upward direction and again leaves the preform.

Therewith there is achieved a substantially better and more intensive flow-treatment of the preform because, on the one hand, the cool plunger tube plunges into the preform and already cools the preform solely by a corresponding cold radiation and, on the other hand, the cooling medium itself also cools the preform in upward direction, increasingly from its inner base surface.

To the earlier mentioned cooling media it is further added, that besides the previously mentioned gaseous cooling medium there can also be used corresponding liquified and deep-cooled gases, such as, for example, liquid air, liquid nitrogen or other liquified deep-cooled air mixtures.

In a preferred form of execution of the plunger tube it is provided that the plunger tube has merely a lower, face-side opening, which is directed essentially upon the inner base region of the preform to be cooled, so that therewith a corresponding flow reversal takes place in the zone of this mouthpiece and the air then rises in the interspace between the outer circumference of the plunger tube and the interior space of the preform.

In another form of execution it is provided that the plunger tube also has corresponding transverse bores, so that, therefore, not only a downward directed, face-side open outflow tube is present, but there still occurs also over corresponding transverse bores the air outlet in the zone lying opposite the inner wall of the preform.

The plunger tube can be made of a plastic material or of a metal material and its inside diameter does not absolutely have to be adapted to the inside diameter of the preform; i.e., the inside diameter of the plunger tube can also be substantially less than the diameter of the corresponding preform.

The outflow opening in the zone of the plunger tube can also be provided with corresponding nozzles in order to generate either corresponding turbulence in this zone or an aimed flow-treatment of certain zones of the preform which for certain reasons must be especially and strongly cooled.

Aimed nozzles, therefore, can be used in connection with the plunger tube in order in order to cool preferably certain zones of the preform in its interior space.

In the interest of simplicity in the present invention there will be spoken exclusively of one plunger tube and a single preform. To the specialist, however, it is clear and well known that in actuality such an injection molding machine with an appertaining after-cooling plate consists of a large number of cavities lying one behind another and that in each cavity there is seated a corresponding preform which is cooled by means of the after-cooling plate.

Such an after-cooling plate contains therefore 10, 20 or even 200 such mold cavities, in which in each case a preform is arranged, there being allocated to each preform a corresponding plunger tube of the appertaining cooling blast station.

Correspondingly also the cooling blast station according to the invention is correspondingly multiplied; i.e., the cooling blast station consists of a distributor plate in which a common distributor chamber is arranged and in this distributor chamber the plunger tubes through which the assigned cooling air is introduced into the preforms correspondingly to be cooled are arranged parallel and in succession.

With the example of execution described there is present to be sure the disadvantage that with the sending under pressure of a gaseous cooling medium into an opening of a preform, undesired air vibrations may arise which are associated with a corresponding noise burden.

A further disadvantage of the first-mentioned example of execution is that the cooling air escapes virtually unused from the preform, because it can no longer be captured and can no longer be drawn upon for further cooling purposes.

In order to avoid these disadvantages, the invention in a further form of execution provides that the cooling blast station does not consist of a simple plunger tube, which is admitted into the preform, but that on the outlet of the preform there is now emplaced with sealing effect an exhaust air collecting chamber, and that the air escaping from the preform and loaded only with relatively slight absorbed heat is collected in the exhaust air collecting chamber, and is only then removed over an outlet.

The arrangement of an exhaust air collecting chamber has the advantage, therefore, that the cooling exhaust air escaping from the preform can be collected in the exhaust air collecting chamber and then, via one or several outlets, further used purposefully.

In the first place by the utilization of such an exhaust air collecting chamber which is emplaced with sealing effect on the after-cooling plate, undesired air vibrations are avoided, because in the exhaust air-collecting chamber an excess pressure arises, which counteracts the arising air vibrations. Furthermore, on the outlet channels of the exhaust air collecting chamber there can still be mounted corresponding mufflers which, after all, was formerly impossible with the simple first-described form of execution, because there the cooling air flowed into the open, unused.

In the second form of execution there is present, therefore, the advantage that now it is possible to arrange exhaust mufflers in the exhaust air channels.

A further advantage is that now it is possible to arrange inlet valves allocated to the entrance of the cooling air so that, therefore, the cooling air is injected into the preform under control only if the inlet channel is opened, and this occurs only if the entire cooling blast station is emplaced with sealing effect on the preform, and the after-cooling commences.

The cooling air, therefore, can be started exactly definitively at a certain point of time and also be shut off again, which was not directly possible with the first-described form of execution. For this reason the first-mentioned form of execution suffered also under the disadvantage that a higher cooling air consumption had to be accepted into the bargain.

The inventive object of the present invention is yielded not only from the object of the individual patent claims, but also from the combination of the individual patent claims among one another.

All the indications and features disclosed in the documents, inclusive of the abstract, especially the spatial design represented in the drawings, are claimed as essential to the invention insofar as they are novel individually or in combination with respect to the state of the art.

BRIEF DESCRIPTION OF THE DRAWINGS

In the following the invention is explained in detail with the aid of drawings representing several courses of execution. Here there proceed from the drawings and their description further features essential to the invention, and advantages of the invention.

MORE DETAILED DESCRIPTION

Figure 1:
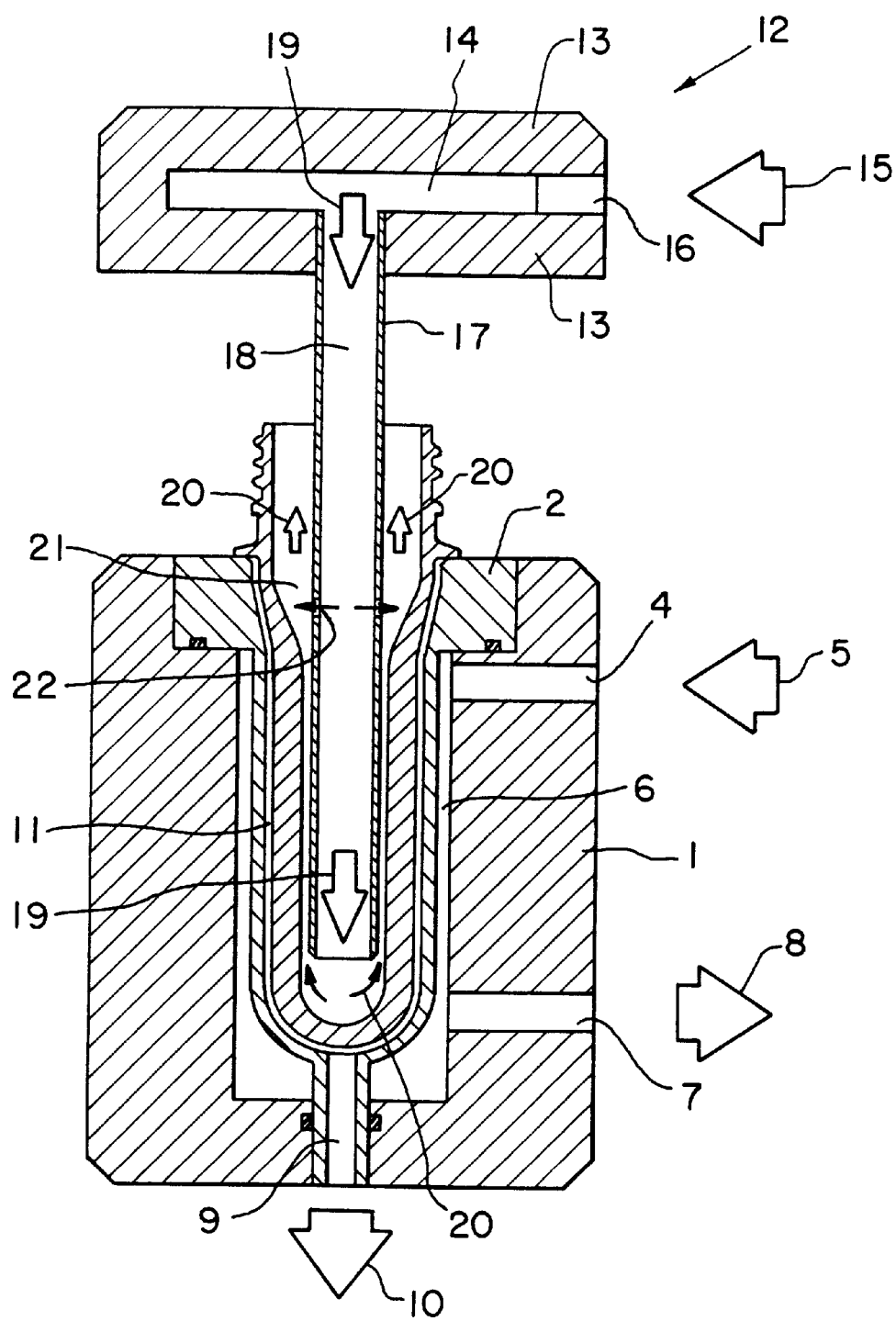
FIG. 1 shows schematically a section through a first form of execution of a cooling blast station FIG. 2 a section through a second form of execution of a cooling blast station, FIG. 3 schematically the cooling blast station according to FIGS. 1 or 2 in a process step, FIG. 4 a second process step, FIG. 5 a third process step, FIG. 6 a fourth process step, FIG. 7 a fifth process step, FIG. 8 a sixth process step, FIG. 9 a seventh process step, FIG. 10 an eighth process step, FIG. 11 a form of execution modified with respect to FIG. 5 with a horizontal cooling blast station either of FIG. 1 or of FIG. 2, FIG. 12 the horizontal form of the cooling blast station according to FIG. 1 or to FIG. 2, in another representation in the comparison according to FIG. 10.

In FIG. 1 there is generally represented an after-cooling plate 1, which, in the interest of simplicity, is represented only in simple form of execution. It was already pointed out in the general specification part that in the drawing plane of FIG. 1, this after-cooling plate 1 is repeated in multiple execution; i.e., several after-cooling plates are represented and present in succession in the drawing plane of FIG. 1 and in each after-cooling plate 1 there is arranged a corresponding inset 2 for a preform 3 to be cooled.

Figure 2:
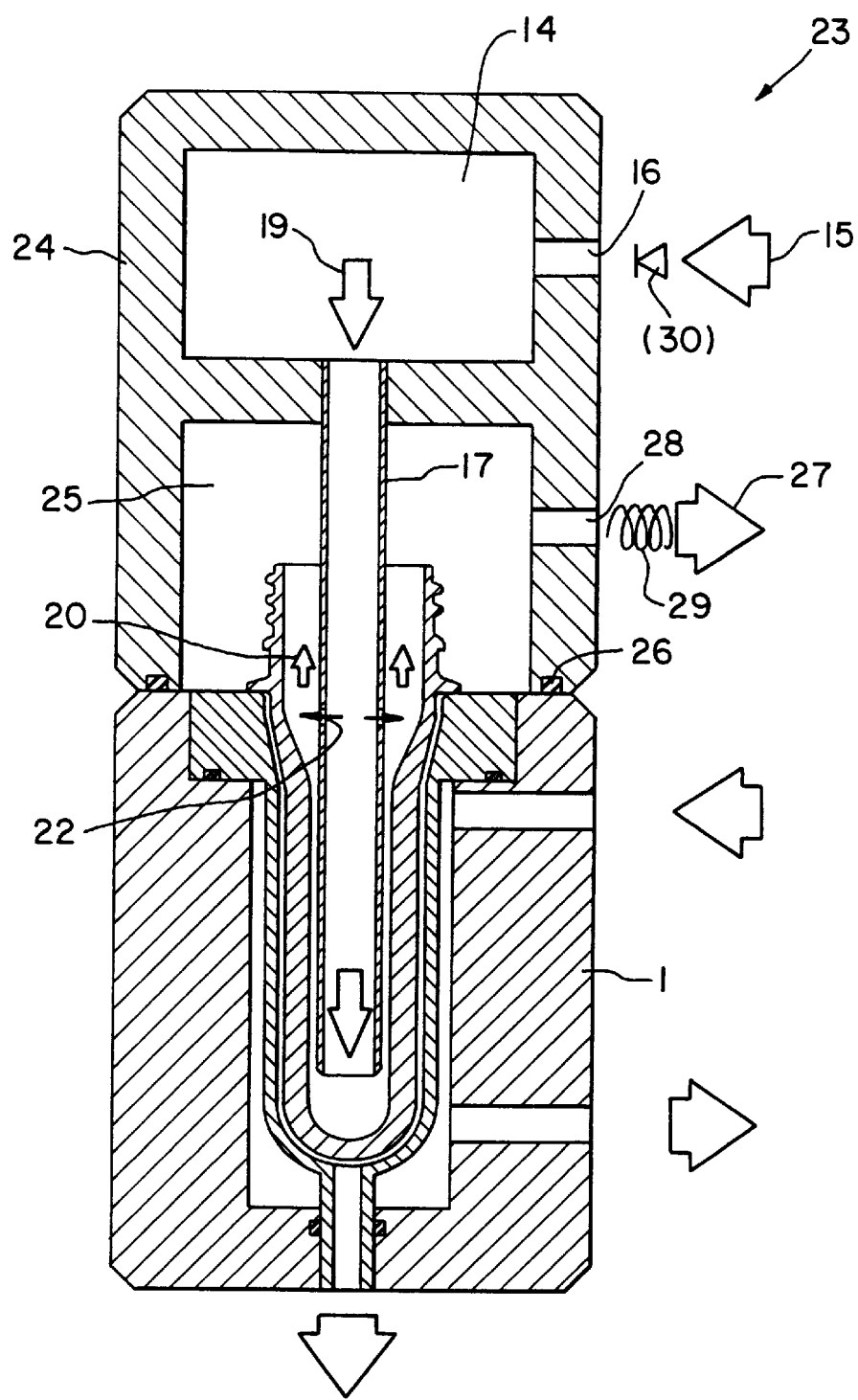

Obviously the after-cooling plates 1 can be arranged parallel next to one another in the drawing plane of FIG. 1 or of FIG. 2, so that they can be present adjacently to one another and also in succession with one another in multiple execution.

The same holds, furthermore, for the cooling blast station 12 represented according to FIG. 1, or the cooling blast station 23 according to FIG. 2, which in correspondence to the design of the after-cooling plate is present in correspondingly multiple executions lying adjacently and lying in succession.

In the interest of simplicity, however, only a single after-cooling plate 1 with a single cooling blast station 12, 23 is described, although the respective arrangement is present in multiple form.

The after-cooling plate 1, therefore, has an inset 2, which forms an inner cavity for the reception of the preform 3 to be cooled.

Figure 3:
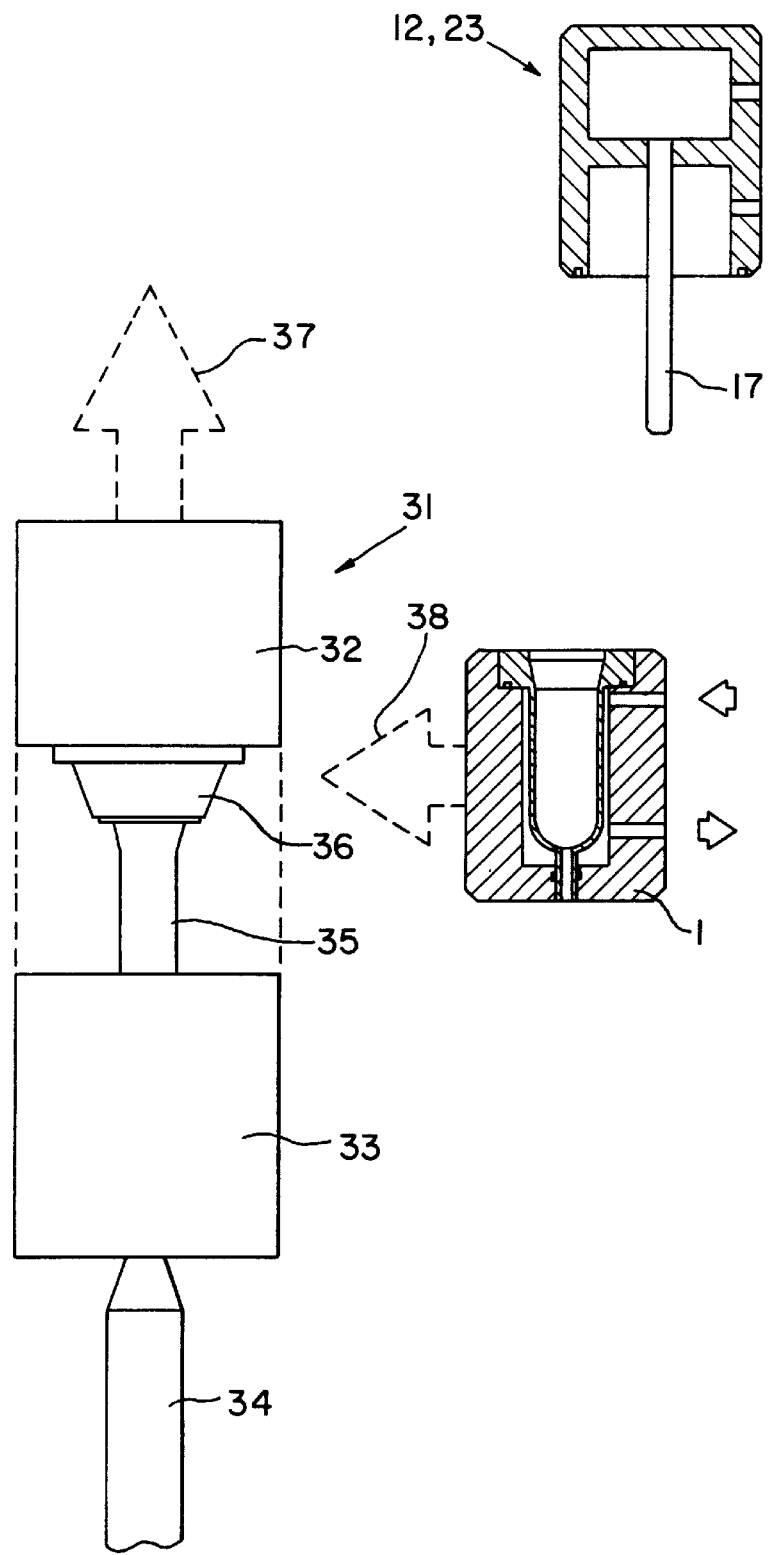

The transition of the preform from the injection molding machine 31 into the after-cooling plate 1, will be explained later with the aid of FIG. 3.

When the preform, therefore, is taken out of the injection molding machine 31 and placed into the after-cooling plate 1, it is cooled in correspondence to the example of execution according to FIG. 1 on its outer circumference and also on its inner circumference.

The cooling on its outer circumference occurs by the means that over the inlet channel 4 in arrow direction 5 a liquid or gaseous cooling medium is admitted, which flows into the cooling channel 6, which cooling channel cools the outer circumference of the inset 2. The cooling medium collects in this cooling channel 6 and is again taken off in arrow direction 8 via the outlet channel 7.

In the interest of graphic clarity it is represented that the preform 3 lies with its outer circumference in a mold space 11 of the inset 2, although this mold space 11 does not exist in reality, because the preform 3 is in bodily contact with the inner wall of the inset 2.

For the cooling of the interior space the invention provides a cooling blast station 12 which consists essentially of a distributor plate 13 which forms a distributor chamber 14 closed in itself, which is open to the outside exclusively over an inlet channel 16, over which the cooling medium is admitted into the distributor chamber 14 [under?] excess pressure.

The cooling medium flows in arrow direction 19 into the plunger tube 17, which forms an inner blow-out channel 18 which is directed into the interior space of the preform 3.

Preferably the front face side of the plunger tube 17 with the blow-out channel 18 ends shortly before the inner base surface of the preform 3, so that there an air reversal can take place in arrow direction 20 and the cooling medium then flows upward in the interior space 21 of the preform and in the process is simultaneously additionally cooled by the outer surface of the plunger tube.

There occurs, therefore, an excellent cooling effect of the cooling medium.

This cooling effect can still be reinforced by the means that in the plunger tube there are present one or more transverse bores 22, through which additional cooling medium emerges into the interior space 21 by the nozzle effect therewith achieved.

For the ejection of the preform 3 out of the inset 2 there is also molded underneath, on the inset 2, a channel on which suction is exerted in arrow direction 10 in order first to suck the preform 3 firmly into the inset 2 and to hold it there. The flow direction can then be reversed so that compressed air can also be sent in opposite direction (arrow direction 10') to convey the preform 3 out of the inset 2.

Instead of the pneumatic sucking-on and ejection, there can also occur a mechanical ejection by means of a core.

FIG. 2 now shows an improved form of execution with respect to FIG. 1, in which it is evident that the cooling blast station 23 consists of two chambers lying one over the other, namely the upper distributor chamber 14 and a lower exhaust air collecting chamber 25 which by means of seals 26 is seated with sealing effect on the upper surface of the inset 2 or of the after-cooling plate 1.

If now a cooling medium is introduced in arrow direction 19 over the plunger tube 17 into the preform 3, then the cooling medium again flows in arrow direction 20 out of the preform, but now it is held in the exhaust air chamber 25.

It is a matter, therefore, of a housing 24 with the aforementioned two chambers 14, 25, which housing 24 now forms the new-type cooling blast station 23.

The advantage of this measure is that in the exhaust air collecting chamber 25 a certain counter-pressure develops which counteracts undesired sound formations in the zone of the interior space 21, so that the noise spread by blowing of the cooling medium into the preform 3 is much reduced. A further advantage is that it is only by emplacing of the exhaust air collecting chamber 25 on the preform that now a muffling hood is formed at all and, furthermore, the exhaust air collecting chamber 25 now collects the exhaust air, which now can be taken off controllably over the outlet channel 28. Therewith the only slightly warmed exhaust cooling air can be fed to further drying and cooling purposes.

In this connection reference is made to a further patent, U.S. Pat. No. 5,513,445 of the same applicant, the disclosure of which is supposed to be covered in its full content by the present disclosure, because there it is specified that the exhaust cooling air can be drawn upon for other drying purposes. Mold cavities, for example, are dried with this exhaust air.

There can also advantageously be arranged mufflers 29 in the outlet channel 28, which avoid any further noise spreading of the arising sound.

The air then flows just in arrow direction 27 through the outlet channel 28 and in so doing it can flow through one or more mufflers 29.

A further advantage of the example of execution according to FIG. 2 is that on the inlet channel 26 there can be arranged a switching valve 30 (but this is not required), which under control can be opened and closed. It is opened only when the sealing of the housing 24 on the after-cooling plate 1 is established, so that, therefore, cooling air cannot escape undesirably. It is closed when the entire cooling blast station 23 is lifted off from the after-cooling plate 1, or when the cooling process is concluded.

Therewith, therefore, the consumption of cooling air can be substantially limited.

With the aid of FIGS. 3 to 12 the process course of the use of a cooling blast station 12, 23 is explained in detail.

It is pointed out that, to be sure, in the interest of graphic simplicity only the cooling blast station 23 is graphically represented; this, however can be replaced by the cooling blast station 12. In FIG. 3 it is represented that an injection molding machine consists essentially of two mold parts 32, 33 movable with respect to one another, the mold part 32 being movable in arrow direction 37 and in counter-direction to this, toward the stationary mold part 33. Between the two mold parts 32, 33 here the mold core 35 is received, which is continued upward by a thread molding part 36. In this mold part 35, 36 the preform 3 is injected in the injection molding process, into which a corresponding plastic mass is injected via the extruder 34 and brought into the mold parts 32, 33 for final hardening.

Figure 4:
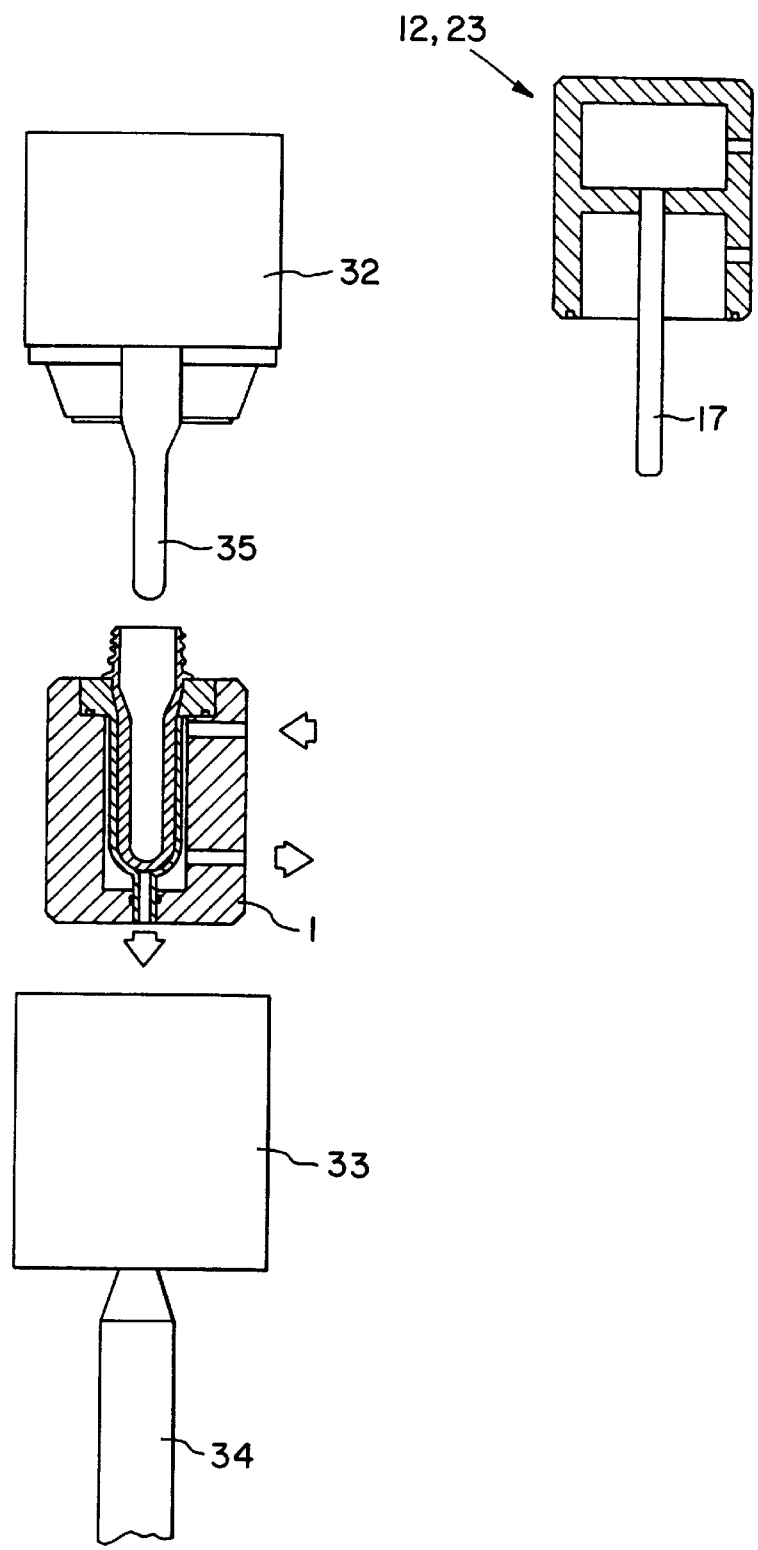

As soon now as the preform 3 was completed in the injection molding machine 31, the movable mold 32 (part) is moved upward in arrow direction 37 and the after-cooling plate 1 is brought into the zone between the two mold parts. This is represented in FIG. 4. The preform here still adheres to the mold core 35 and is then installed in the cavity of the after-cooling plate 1, as is represented in FIG. 4.

The cooling blast station 12, 23 here is still in the switched-off and inactive sate.

Figure 5:
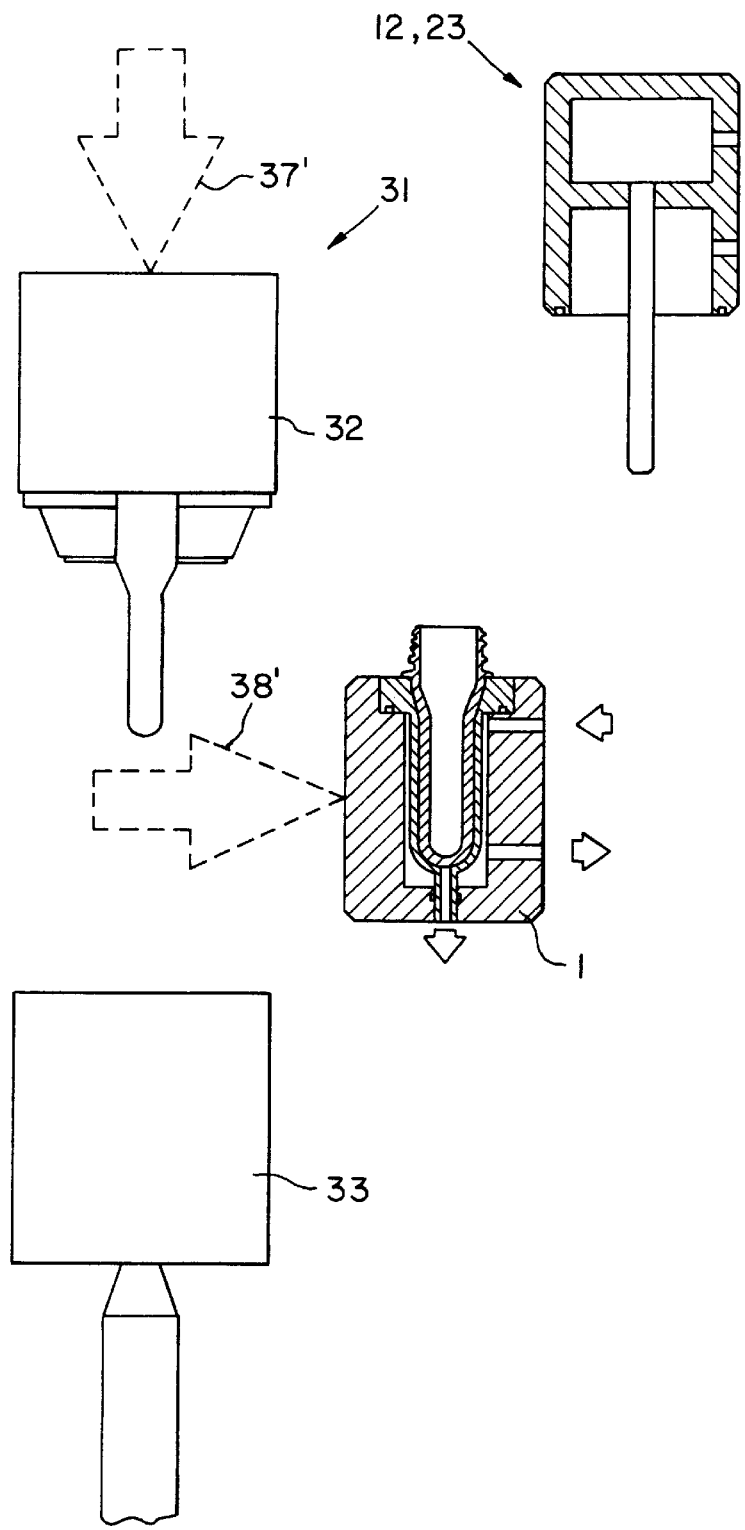
Figure 6:
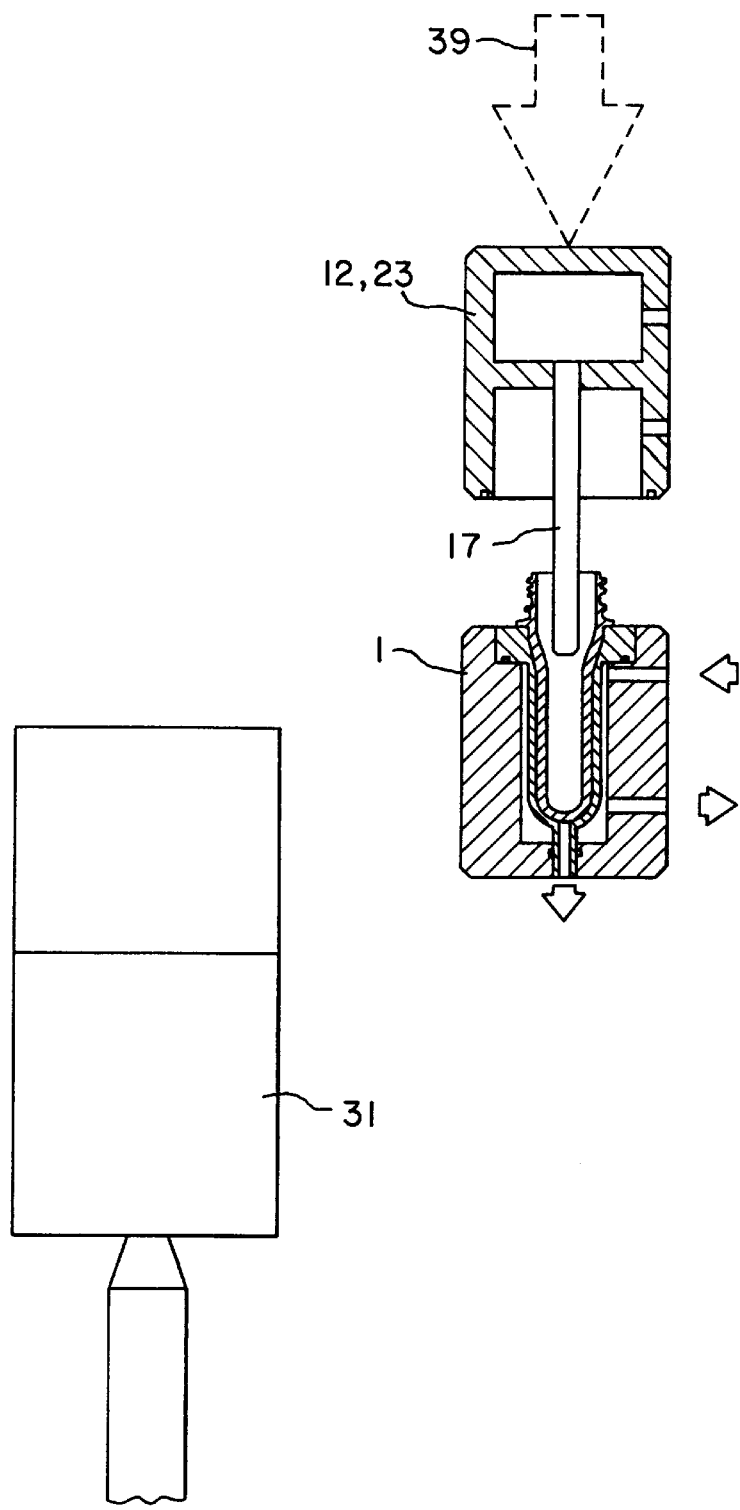

Now according to FIG. 5 the after-cooling plate 1 is moved in arrow direction 38 out of the zone of the injection molding machine 31 and simultaneously the movable mold plate 32 is again driven downward in arrow direction 37, so that according to FIG. 6 the injection molding machine 31 is available for a further injection molding operation.

There is now carried out the after-cooling of the preform according to FIG. 6, as the cooling blast station 12, 23 is moved in arrow direction 39 against the after-cooling plate 1, so that the plunger tube 17 plunges into the premold 3.

Figure 7:
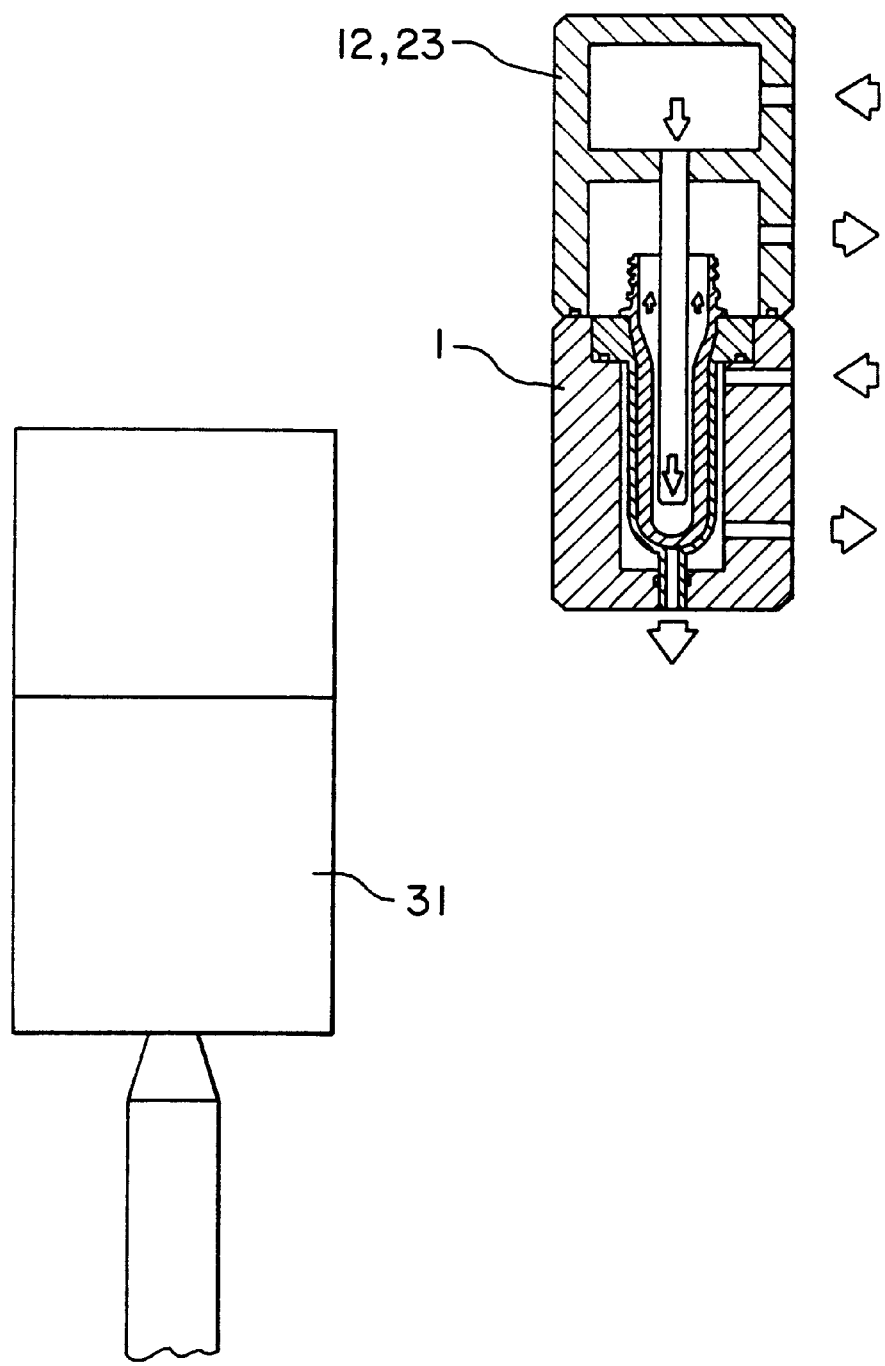

In FIG. 7 the after-cooling proper now takes place, which was thoroughly described with the aid of FIGS. 1 and 2. Simultaneous a new preform is injected with the injection molding machine 31.

Figure 8:
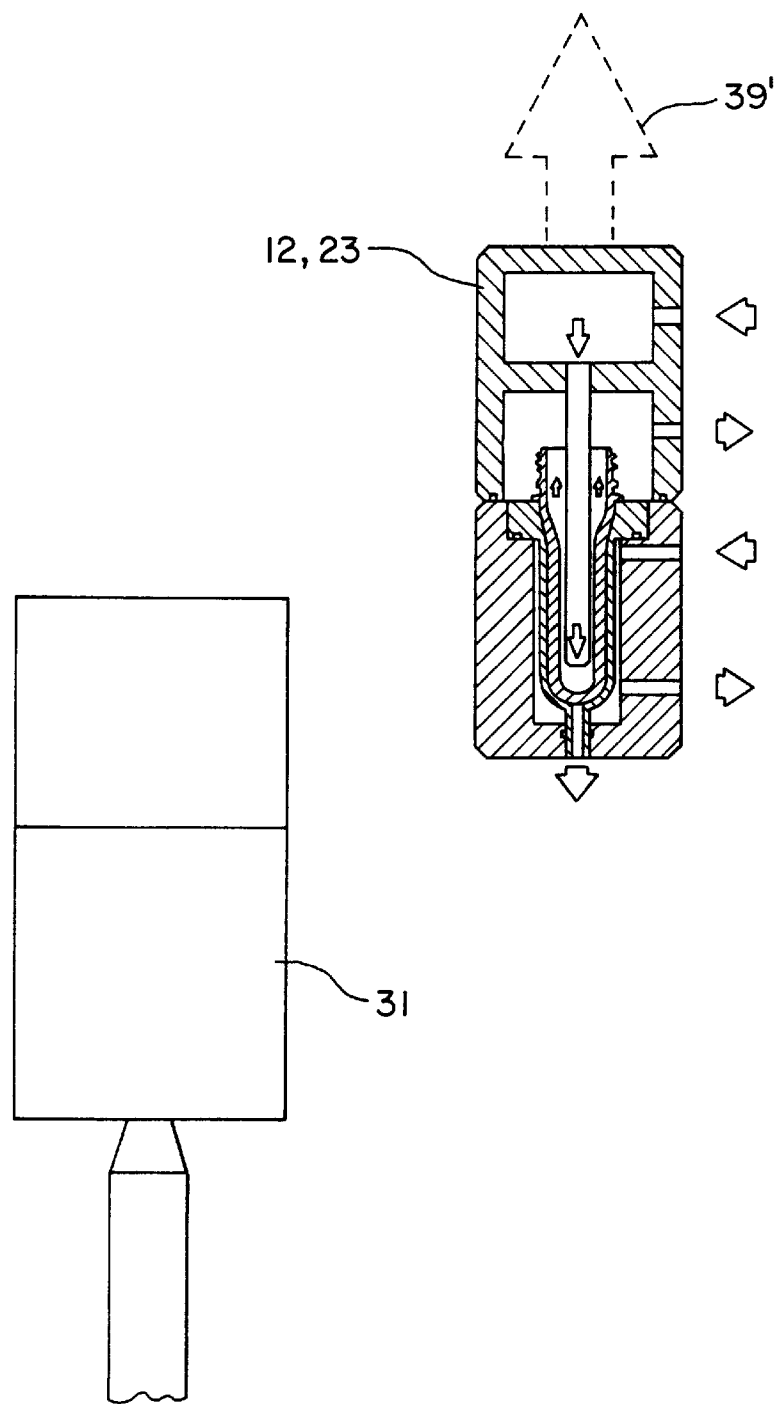
Figure 9:
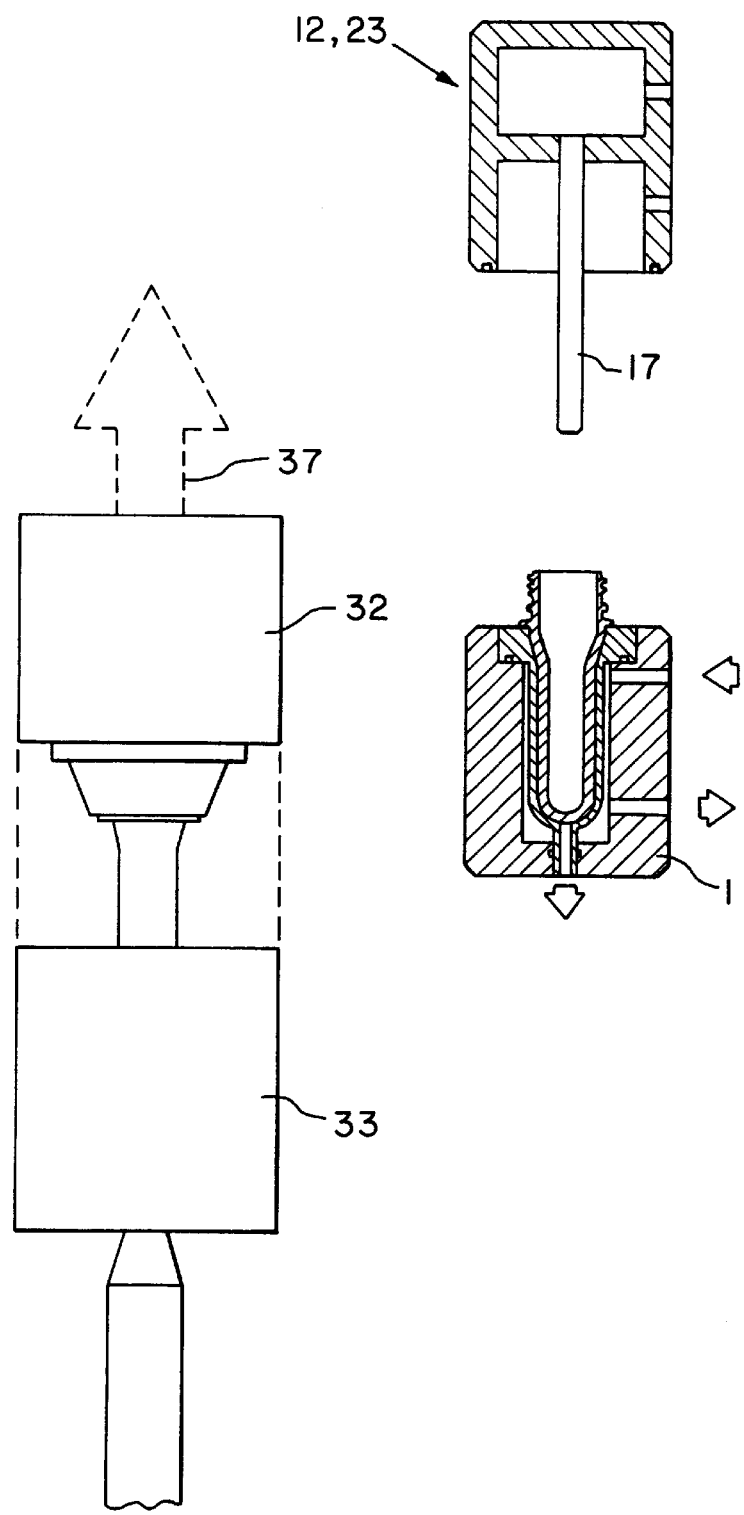

Once the after-cooling of the preform according to FIG. 8 has been completed, the cooling station 12, 23 is moved upward in arrow direction 39, so that the plunger tube 17 comes out of engagement with the preform, in which process according to FIG. 9 the injection molding machine is ready to deliver a new charge. The process, therefore, is repeated which was already explained in FIG. 3.

Figure 10:
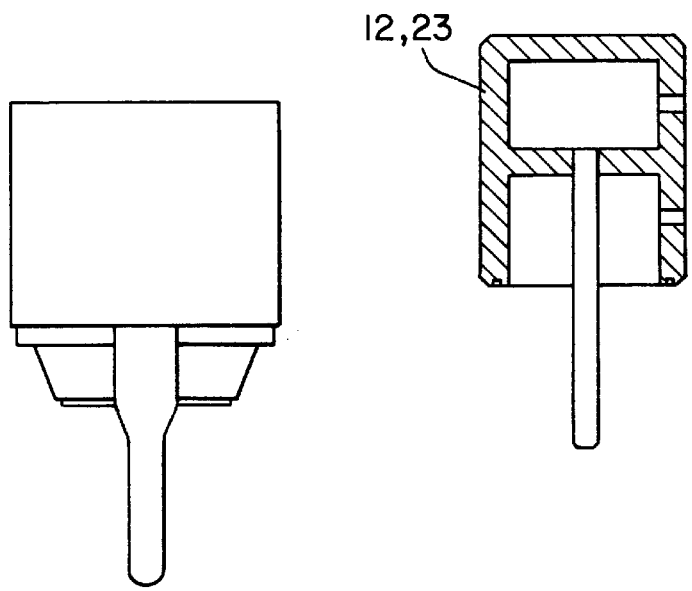
Figure 10:
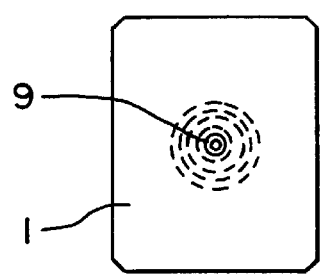
Figure 10:
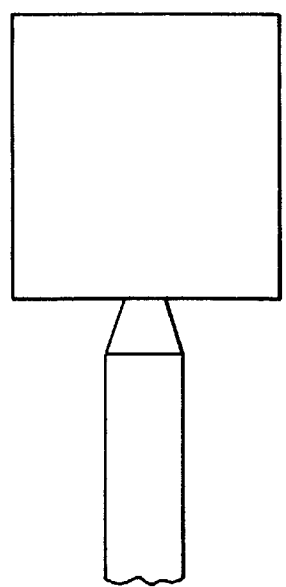

FIG. 10 shows that for the ejecting of the preform 3 out of the after-cooling plate 1, the entire after-cooling plate 1 can also be rotated. This is represented in FIG. 1, because there the after-cooling plate 1 is rotated through 90° as compared to its position in FIG. 9, so that now the view upon the base side and the channel 9 is now represented in FIG. 10.

Figure 11:
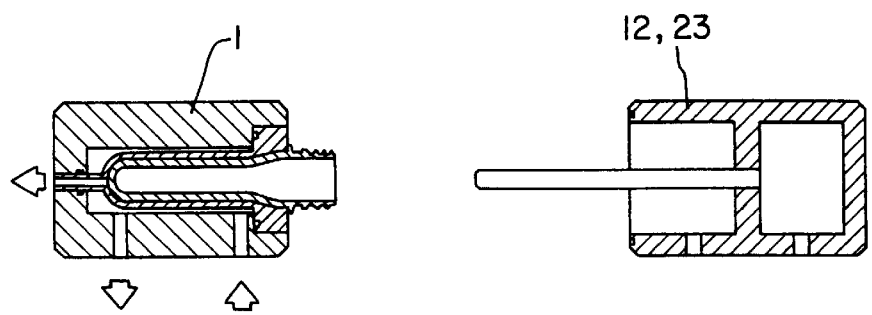
Figure 11:
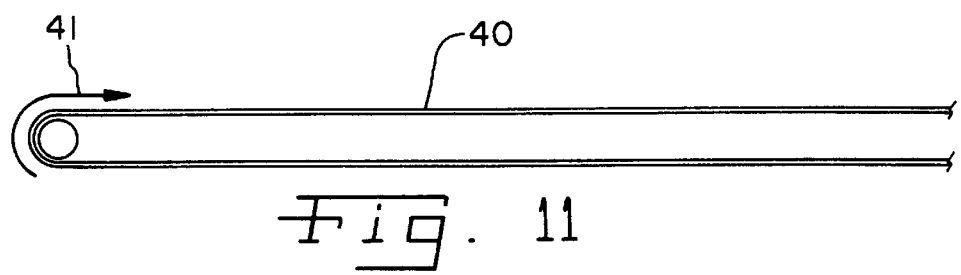
Figure 12:
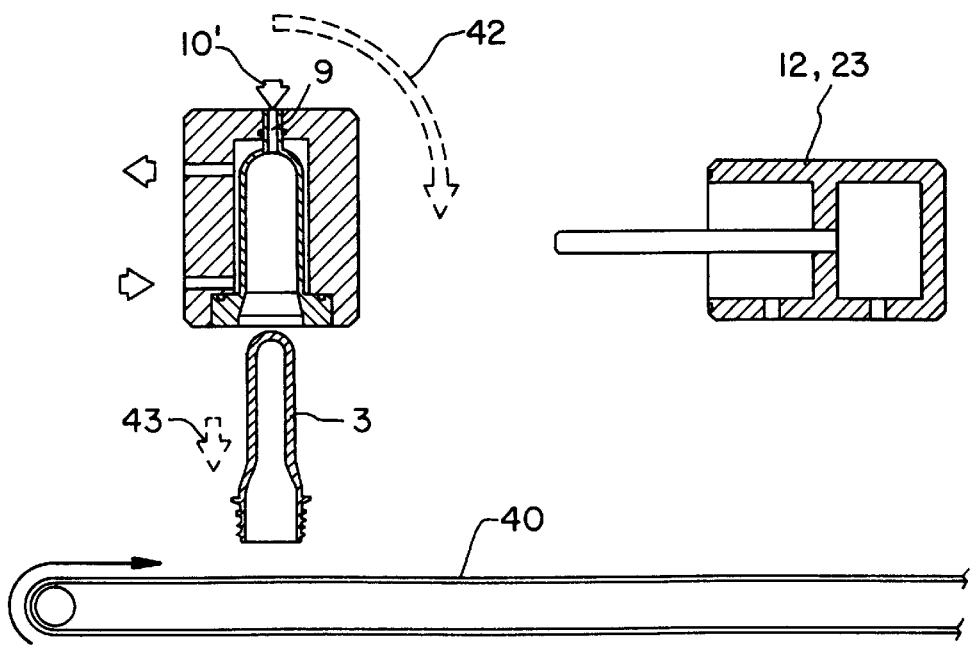

This situation is again shown in FIG. 11 in rotated representation, in which it is simultaneously evident that under the after-cooling plate 1 there is arranged a transport band 40 which is driven, for example, in arrow direction 41. Now the after-cooling plate 1 is swung downward through 90° in arrow direction 42, so that the preform is now ejected by a corresponding ejection process or throw-out process in downward direction, by the introduction of excess pressure into the channel 9 (arrow direction 43), and falls there onto the transport band 40 and is moved off.

Obviously here the cooling blast station 12, 23 can be made stationary or it can also be constructed so as to swing with the after-cooling plate.

It is also provided, within the scope of the present invention, that the after-cooling plate 1 is replaced by a transfer plate which picks up the preforms from the injection molding machine and that only then the transfer plate transfers the preforms to an after-cooling plate with which then the cooling blast stations 12, 23 execute their after-cooling.

Likewise several after-cooling plates and several cooling blast stations 12, 23 can be used parallel to one another. In a first process step then a first after-cooling plate can pick up the preforms from the injection molding machine and process them together with the corresponding cooling blast station 12, 23, so that during this cooling a second after-cooling plate travels into the zone of the injection molding machine 31 and picks up a further charge of preforms, which again cooperates with separate cooling blast stations 12, 23.

REFERENCE NUMBERS

1. After-cooling plate
2. Inset
3. Preform
4. Inlet channel
5. Arrow Direction
6. Cooling channel
7. outlet channel
8. Arrow direction
9. Channel
10. Arrow direction
11. Mold space
12. Cooling blast station
13. Distributor plate
14. Distributor chamber
15. Arrow direction
16. Inlet channel
17. Plunger tube
18. Blow-out channel
19. Arrow direction
20. Arrow direction
21. Interior space
22. Transverse bore
23. Cooling blast station
24. Housing
25. Exhaust air collecting chamber
26. Seal
27. Arrow direction
28. outlet channel
29. Muffler
30. Valve
31. Injection molding machine
32. Movable mold part
33. Stationary mold part
34. Extruder
35. Mold core
36. Thread molding part
37. Arrow direction
38. ""

39. ""
40. Transport band
41. Arrow direction
42. Arrow direction
43. ""

What is claimed is:

1. A method for the after-cooling of preforms that are produced in an injection molding to thereafter blow a hollow body therefrom in a subsequent hollow blasting process, the method comprising:
   providing a preform having a closed bottom; arranging the preform in an inset of an after-cooling plate;
   cooling an exterior surface of the preform with a cooling medium; and
   cooling an interior surface of the preform with a cooling medium.

2. A method according to claim 1, wherein the cooling medium used to cool the interior surface of the perform is blown or injected into an interior space of the preform.

3. A method according to claim 2, wherein the cooling medium flows upward along an inner surface of the preform and leaves the preform.

4. A method according to claim, 2, wherein an outflow of the cooling medium used to cool the interior surface of the preform is directed upon an inner base zone of the preform.

5. A method according to claim 2, wherein the cooling medium used to cool the interior surface of the preform is selected from the group consisting of liquids and gases and mixtures thereof.

6. A method according to claim 2, wherein the cooling medium used to cool the interior surface of the preform comprises air.

7. A method according to claim 2, wherein the cooling medium used to cool the interior surface of the preform comprises dry air.

8. A method according to claim 2, wherein the cooling medium used to cool the interior surface of the preform comprises cooled and dried air.

9. A method according to claim 2, wherein the cooling medium used to cool the interior surface of the preform comprises air that is cooled to a temperature as low as −35° C.

10. A method according to claim 2, wherein cooling medium exhausted from the preform is collected in an exhaust cooling medium collecting chamber and thereafter removed through an outlet.

11. The method according to claim 2, wherein the cooling medium used for cooling the interior surface of the preform comprises a fluid.

12. The method according to claim 1, wherein the cooling medium used to cool the interior surface of the preform is blown or injected into an interior space of the preform.

13. A method according to claim 1, wherein the cooling medium used to cool the interior surface of the preform is applied to the preform through a feed element that comprises a plunger tube and the cooling medium is introduced under excess pressure into the preform.

14. A method according to claim 4, wherein the plunger tube is inserted into the preform.

15. A method according to claim 13, wherein a flow reversal of the cooling medium takes place in a zone of an outflow point from the plunger tube and the cooling medium thereby flows upward in an intermediate space between an outer circumference of the plunger tube and an interior space of the preform.

16. The method according to claim 13, wherein aimed nozzles are used in the form of transverse bores in the plunger tube in order to cool interior zones of the preform.

17. A method according to claim 13, wherein aimed nozzles comprising transverse bores in the plunger tube are used to generate turbulence in the cooling medium used to cool the interior surface of the preform.

18. The method according to claim 13, wherein the plunger tube is provided with transverse bores in order to achieve an aimed flow to interior zones of the preform.

19. The method according to claim 13, wherein entry-inlet valves are provided to control the flow of the cooling medium.

20. A device for the after-cooling of preforms that are produced in an injection molding to thereafter blow a hollow body therefrom in a subsequent hollow blasting process, the device comprising:
   an after-cooling plate having an inset into which closed bottoms of preforms are arranged; and
   a plunger tube arranged to direct a cooling medium into the closed-bottomed preforms.

21. A device according to claim 20, wherein the plunger tube has a lower, face-side opening.

22. A device according to claim 21, comprising a plurality of plunger tubes that are arranged to be received in a plurality of preforms.

23. A device according to claim 22, comprising a plurality of cooling blast stations, each associated with one of the plurality of plunger tubes.

24. A device according to claim 21, further comprising an exhaust cooling medium collecting chamber.

25. A device according to claim 24, wherein the preform includes an exit zone in which an exhaust cooling medium collecting chamber is sealingly positioned on the after-cooling plate.

26. A device according to claim 25, wherein cooling medium escaping from the preform is collected in the exhaust cooling medium collecting chamber and removed over through and outlet.

27. A device according to claim 25, wherein mufflers are mounted on outlet channels of the exhaust cooling medium collecting chamber.

28. A device according to claim 25, wherein the plunger tube comprises an inlet provided with inlet valves.

29. A device according to claim 28, wherein the plunger tube is made of a plastic material.

30. A device according to claim 28, wherein the plunger tube is made of a metal.

31. A device according to claim 20, wherein the plunger tube has transverse bores.

32. A device according to claim 20, wherein the plunger tube has a lower, face-side opening and transverse bores.

33. A method for the after-cooling of preforms that are produced in an injection molding to thereafter blow a hollow body therefrom in a subsequent hollow blasting process, the method comprising:
   providing a preform having a closed bottom;
   arranging the preform in an inset of an after-cooling plate;
   cooling an exterior surface of the preform with a cooling medium; and
   cooling an interior surface of the preform with a cooling medium, by applying the cooling medium through a feed element that comprises a plunger tube so that the cooling medium is introduced under excess pressure into the preform, the plunger tube including transverse bores which define nozzles that are used to aim the cooling medium in order to cool interior zones of the preform.

34. A method for the after-cooling of preforms that are produced in an injection molding to thereafter blow a hollow body therefrom in a subsequent hollow blasting process, the method comprising:

provides a preform having a closed bottom;

arranging the preform in an inset of an after-cooling plate;

cooling an exterior surface of the preform with a cooling medium; and cooling an interior surface of the preform with a cooling medium, by applying the cooling medium through a feed element that comprises a plunger tube so that the cooling medium is introduced under excess pressure into the preform, the plunger tube including transverse bores which generate turbulence in the cooling medium.

35. A method for the after-cooling of preforms that are produced in an injection molding to thereafter blow a hollow body therefrom in a subsequent hollow blasting process, the method comprising:

providing a preform having a closed bottom;

arranging the preform in an inset of an after-cooling plate;

cooling an exterior surface of the preform with a cooling medium; and cooling an interior surface of the preform with a cooling medium that is blown or injected into an interior space of the preform, the cooling medium comprising air that is cooled to a temperature as low as −35° C.

36. A method for the after-cooling of preforms that are produced in an injection molding to thereafter blow a hollow body therefrom in a subsequent hollow blasting process, the method comprising:

providing a preform having a closed bottom;

arranging the preform in an inset of an after-cooling plate;

cooling an exterior surface of the preform with a cooling medium;

cooling an interior surface of the preform with a cooling medium that is blown or injected into an interior space of the preform;

exhausting cooling medium from the preform;

collecting the exhausted cooling medium in a collecting chamber; and thereafter removing the collected cooling medium through an outlet.

37. A device for the after-cooling of preforms that are produced in an injection molding to thereafter blow a hollow body therefrom in a subsequent hollow blasting process, the device comprising:

an after-cooling plate having an inset into which closed bottoms of preforms are arranged; and a plunger tube having a lower, face-side opening and arranged to direct a cooling medium into the closed-bottomed preforms.

38. A device according to claim 37, further comprising an exhaust cooling medium collecting chamber.

39. A device according to claim 38, wherein the preform includes an exit zone in which an exhaust cooling medium collecting chamber is sealingly positioned on the after-cooling plate.

40. A device according to claim 39, wherein cooling medium escaping from the preform is collected in the exhaust cooling medium collecting chamber and removed over through and outlet.

41. A device according to claim 40, wherein mufflers are mounted on outlet channels of the exhaust cooling medium collecting chamber.

42. A device according to claim 41, wherein the plunger tube comprises an inlet provided with inlet valves.

43. A device according to claim 42, wherein the plunger tube is made of a plastic material.

44. A device according to claim 43, wherein the plunger tube is made of a metal.

45. A device for the after-cooling of preforms that are produced in an injection molding to thereafter blow a hollow body therefrom in a subsequent hollow blasting process, the device comprising:

an after-cooling plate having an inset into which closed bottoms of preforms are arranged; and a plunger tube having transverse bores and arranged to direct a cooling medium into the closed-bottomed preforms.

46. A device for the after-cooling of preforms that are produced in an injection molding to thereafter blow a hollow body therefrom in a subsequent hollow blasting process, the device comprising:

an after-cooling plate having an inset into which closed bottoms of preforms are arranged; and a plunger tube having a lower, face-side opening and transverse bores and arranged to direct a cooling medium into the closed-bottomed preforms.

* * * * *